Aug. 19, 1930.  H. E. HODGSON  1,773,141
DOG PAN
Filed July 30, 1925   2 Sheets-Sheet 1
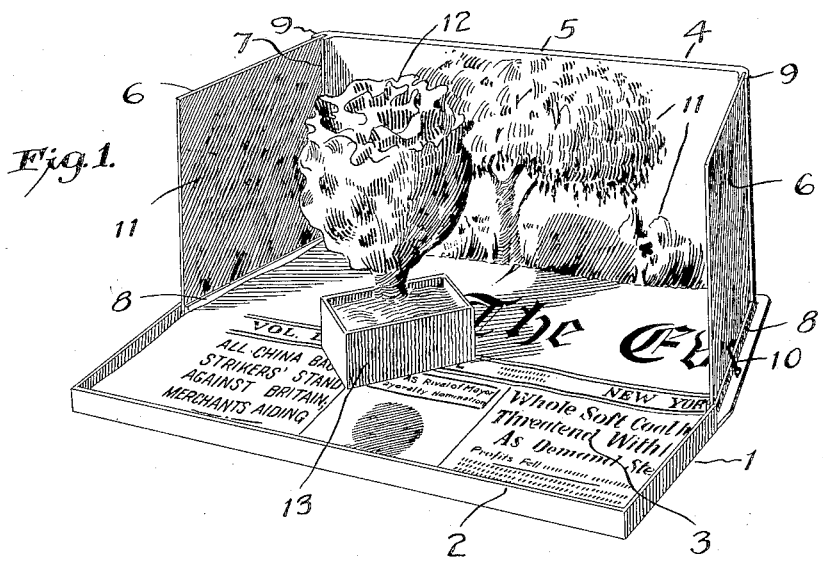
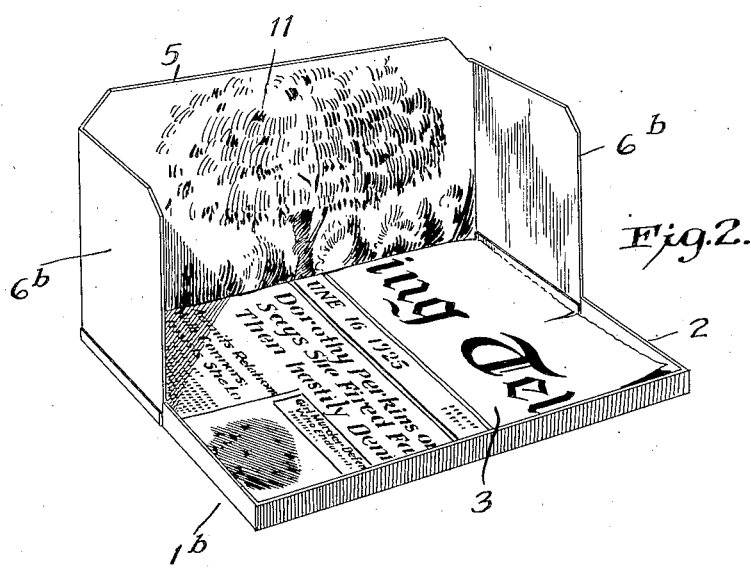
Inventor
Harriette Ensley Hodgson
By her Attorney Aug. 19, 1930. H. E. HODGSON 1,773,141
DOG PAN
Filed July 30, 1925 2 Sheets-Sheet 2
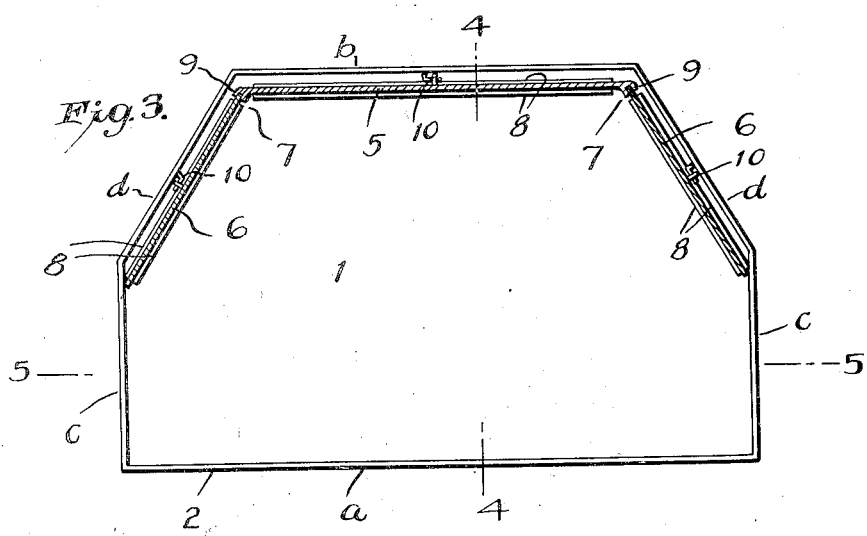
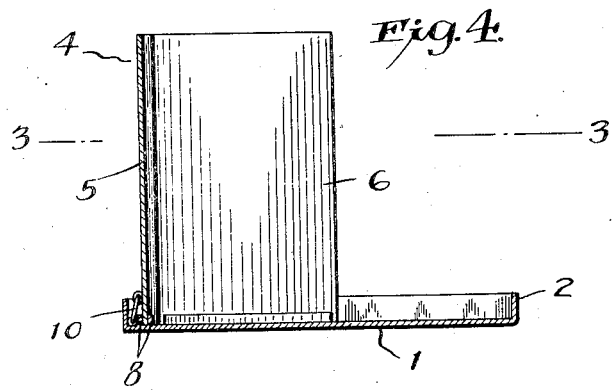
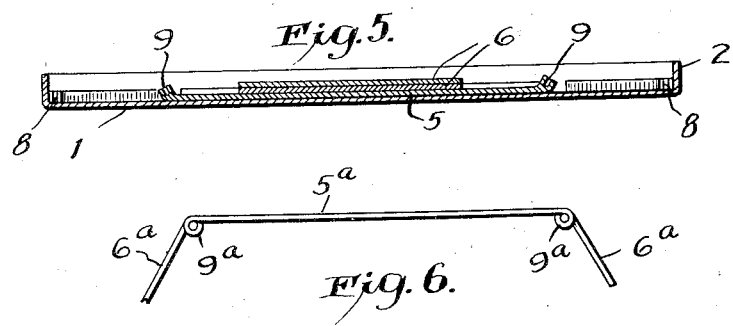
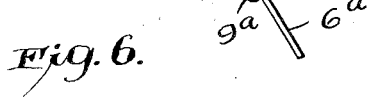

Patented Aug. 19, 1930

1,773,141

UNITED STATES PATENT OFFICE

HARRIETTE ENSLEY HODGSON, OF NEW YORK, N. Y.

DOG PAN

Application filed July 30, 1925. Serial No. 47,057.

My invention has to do with the care and keeping of dogs, and more particularly dogs kept in cities or towns where it is impossible for them to live naturally. It is a sad fact that the life of man's most loyal friend, when he shares the conditions of urban existence with his master or mistress, is comparatively short. The death of a good dog is always a peculiarly distressing thing, and is likely to be especially so when the relation between dog and master has been so close as it necessarily becomes in an apartment, for example. Realization of these facts causes many persons to forego a companionship which they would otherwise greatly enjoy.

It is generally believed that the great cause of canine ills is lack of proper exercise, and most dog owners living in cities therefore put themselves to considerable pains to see to it that their dogs have a certain amount of exercise. The need for activity, however, varies with the breed. It is my belief that an equally serious handicap, if not the greater one, is the artificial restraint which is unavoidably imposed upon the dog's bodily functions. A city dog is commonly required to restrain himself until he is taken out, and while many dogs are "trained to a newspaper", this is not particularly satisfactory either to the dog or for the owner.

The purpose of my invention is to provide a means which will permit a house or apartment dog to relieve itself at inclination, as it should, and which, yet, will avoid all dirt or nuisance. The device comprises a low-rimmed pan of adequate size on which a dog may go to relieve himself, the pan being designed to receive a renewable newspaper lining, and having a back or wall. This wall is formed to present one or more corners, and should bear a representation of scenery, or such decoration or color scheme as will have an appeal to a dog. An important additional feature consists in an object, such, for example, as an imitation shrub or small tree, placed on the pan in front of and at a distance from the wall. It is very desirable that the object be movable to various positions on the pan with reference to the wall, as dogs are inclined to be whimsical in these matters. By making the wall collapsible, it and the pan proper can be packed flat for shipment, or when traveling. The latter is important because a dog's habits, once established, should not be disturbed.

In the accompanying drawings, forming part hereof:

Fig. 1 is a perspective view of a preferred embodiment of the invention;

Fig. 2 is a perspective view of another form;

Fig. 3 is a sectional plan view of the form shown in Fig. 1, taken on the line 3—3 of Fig. 4;

Fig. 4 is a vertical section on the line 4—4 of Fig. 3;

Fig. 5 is a section on the line 5—5 of Fig. 3, showing the parts collapsed; and

Fig. 6 is fragmentary top view, showing that the back wall and its wings may be hinged.

The pan 1 is preferably of oblong form, and is of a proper size so that a dog can go upon its surface and preferably move about to an extent within its confines. It may naturally be made in somewhat varying sizes; a medium size could be, for example, about nineteen by twenty-two inches.

The pan is provided along its edge with a low rim, ledge or flange 2, which should not be much higher than is required to retain a folded newspaper lining 3 and to keep dirt or liquid from getting onto the floor. If there were a high rim in front, the dog would be likely to use the outside of the rim, which would defeat the object of the device.

At the back, and also preferably at the two sides, or ends, there is a comparatively high, upstanding wall 4. This wall acts as a shield, and at its inner side affords an upright surface which the dog may use. By constituting the wall of a back section proper 5 and side wings 6, corners 7 are provided, which are quite important in making the device acceptable to a dog, and also insure the maximum of protection to the apartment. It is especially advantageous when the internal corners are obtuse, as shown more particularly in Figs. 1 and 3, in which case the pan may be made six sided in plan, as seen in Fig. 3, with a long front side $a$, a short rear side $b$, two short end sides $c$ perpendicular to the front side, and two inclined rear sides $d$. It is better to extend the side wings only part way forward from the back wall section, leaving part of the side portions $c$, as well as the front, open except for the ledge 2. The ledge may extend all the way around the pan, or only to the wall.

The wall may be made collapsible so as to fold flat with the tray in the manner shown in Fig. 5, by making the sections 5 and 6 of separate pieces, which, when set up, are removably stepped in channel flanges 8 on the pan proper, and fit each other at their adjoining edges by means of grooved slip joints 9. Hinge joints may also be used, as is illustrated in Fig. 6, where wall sections marked $5^a$ and $6^a$ are shown connected by hinges $9^a$ enabling them to be folded. The collapsible or knock-down wall is held erect by suitable hooks or fastenings 10.

The inner face of the wall is decorated by painting, printing or other process of decoration in a manner to increase the utility of the device. A representation or suggestion 11 of outdoor scenery is indicated in the drawing, but naturally the invention is not limited to any particular scheme of decoration as such, the purpose being to provide means to accustom the dog readily to the use of the device.

An object such as illustrated at 12 in Fig. 1 standing on the bottom of the pan, in front of the background on the wall, further materially increases the utility of the device. The object may simulate a bush, for example, standing in a box of earth, the box 13 affording a stable base which will tend to keep the object from being knocked over even though it is not fastened. The object can thus be moved about so as to position it in the most desirable spot.

In the form shown in Fig. 2, the pan $1^b$ is rectangular and the wings $6^b$ are at right angles to the back section $5^b$. This view also illustrates the fact that the wall may be rigid with the tray, if the knock-down feature is not desired.

What I claim as new is:

A device of the character described comprising an oblong flat pan to be placed on the floor and of a size for an average size dog to go and move about upon, said pan being without openings, imperforate side and rear shield walls rising from the pan to a considerable height, the longer dimension of the pan being parallel with said back wall, said walls being in angular relation to each other to form corners and the partial enclosure formed by said walls being entirely open at the top, said side walls rising from approximately the rear halves of the sides of the pan, and a low rim rising from the forward parts of the sides and from the front of the pan.

HARRIETTE ENSLEY HODGSON.